(12) United States Patent
Whitehead et al.

(10) Patent No.: US 6,723,263 B2
(45) Date of Patent: Apr. 20, 2004

(54) APPARATUS AND METHOD OF MAKING INTERIOR TRIM PANEL

(75) Inventors: David Wayne Whitehead, Rochester Hills, MI (US); Carl Henry Visconti, Clarkston, MI (US); Arthur Carl Stein, Grosse Ile, MI (US); David M. White, Butler, PA (US); Thomas W. Gibson, Industry, PA (US); Ismael Rodriguez, W. Chester, PA (US)

(73) Assignees: Delphi Technologies, Inc., Troy, MI (US); JSP Licenses, Inc., Malbern, PA (US)

( * ) Notice: Subject to any disclaimer, the term of this patent is extended or adjusted under 35 U.S.C. 154(b) by 149 days.

(21) Appl. No.: 09/962,031

(22) Filed: Sep. 25, 2001

(65) Prior Publication Data

US 2003/0057583 A1 Mar. 27, 2003

(51) Int. Cl.⁷ ............................................... B29C 44/06
(52) U.S. Cl. ..................... 264/45.4; 264/46.4; 264/46.6; 264/259; 264/275
(58) Field of Search ............................... 264/45.4, 46.4, 264/46.5, 46.6, 259, 275

(56) References Cited

U.S. PATENT DOCUMENTS

| 3,808,743 A | 5/1974 | Renner et al. |
| 3,964,208 A | 6/1976 | Renner et al. |
| 3,989,275 A | 11/1976 | Finch et al. |
| 4,411,944 A | 10/1983 | Moore |
| 4,519,964 A | 5/1985 | Rosen |
| 4,549,761 A | 10/1985 | Lee et al. |
| 4,562,025 A | 12/1985 | Gray |
| 4,662,115 A | 5/1987 | Ohya et al. |
| 4,751,249 A | * 6/1988 | Wycech ........................ 521/54 |
| 4,766,025 A | 8/1988 | Sanok et al. |
| 4,783,114 A | 11/1988 | Welch |
| 4,800,681 A | 1/1989 | Skillen et al. |
| 4,806,094 A | 2/1989 | Rhodes, Jr. et al. |
| 4,810,452 A | 3/1989 | Taillefert et al. |
| 4,827,671 A | 5/1989 | Herringshaw et al. |
| 4,845,894 A | 7/1989 | Herringshaw et al. |
| 4,853,995 A | * 8/1989 | Bethell et al. .................. 5/481 |
| 4,873,045 A | 10/1989 | Fujita et al. |
| 5,004,292 A | 4/1991 | Horne |
| 5,040,335 A | 8/1991 | Grimes |
| 5,091,031 A | 2/1992 | Strapazzini |

(List continued on next page.)

FOREIGN PATENT DOCUMENTS

| JP | 54-9628 | 4/1979 |
| JP | 57-199633 | 12/1982 |
| JP | 5-147121 | 6/1993 |

*Primary Examiner*—Allan R. Kuhns
(74) *Attorney, Agent, or Firm*—Scott A. McBain

(57) ABSTRACT

A method of making an interior trim panel for attachment to structure of a vehicle includes the steps of placing a trim insert into a cavity of an apparatus and over a first seal thereof. The method also includes the steps of loading a retainer over the trim insert to sandwich the trim insert between the retainer and the first seal and closing the apparatus. The method further includes the steps of filling the cavity with a plastic material and introducing steam into the apparatus to expand the plastic material to form a substrate and bonding the substrate against the trim insert to form an interior trim panel.

13 Claims, 2 Drawing Sheets

U.S. PATENT DOCUMENTS

| | | | |
|---|---|---|---|
| 5,095,659 A | 3/1992 | Benoit et al. | |
| 5,102,163 A | 4/1992 | Ishikawa | |
| 5,143,667 A | 9/1992 | Matsuura et al. | |
| 5,224,299 A | 7/1993 | Abe | |
| 5,271,885 A | 12/1993 | Denker et al. | |
| 5,306,068 A | 4/1994 | Nakae et al. | |
| 5,328,651 A | 7/1994 | Gallagher et al. | |
| 5,340,425 A | 8/1994 | Strapazzini | |
| 5,387,390 A | 2/1995 | Kornylo | |
| 5,411,688 A | 5/1995 | Morrison et al. | |
| 5,418,032 A | 5/1995 | Martin | |
| 5,419,606 A | 5/1995 | Hull et al. | |
| 5,429,786 A | 7/1995 | Jogan et al. | |
| 5,462,482 A | 10/1995 | Grimes | |
| 5,474,841 A | 12/1995 | Matsuki et al. | |
| 5,482,344 A | 1/1996 | Walker et al. | |
| 5,535,553 A | 7/1996 | Staser et al. | |
| 5,535,571 A | 7/1996 | Nichols | |
| 5,536,351 A | 7/1996 | Rheinlander et al. | |
| 5,580,119 A | 12/1996 | Uchida et al. | |
| 5,580,501 A | 12/1996 | Gallagher et al. | |
| 5,582,789 A | * 12/1996 | Stein et al. | 264/46.4 |
| 5,595,415 A | 1/1997 | Beaulat | |
| 5,603,548 A | 2/1997 | Gandhi et al. | |
| 5,618,477 A | 4/1997 | Suzuki | |
| 5,626,382 A | 5/1997 | Johnson et al. | |
| 5,695,865 A | 12/1997 | Shimizu | |
| 5,709,828 A | * 1/1998 | Bemis et al. | 264/46.5 |
| 5,762,394 A | 6/1998 | Salmonowicz et al. | |
| 5,776,509 A | 7/1998 | Ota et al. | |
| 5,866,232 A | 2/1999 | Gatzmanga | |
| 5,904,002 A | 5/1999 | Emerling et al. | |
| 5,924,760 A | 7/1999 | Krajewski et al. | |
| 5,928,776 A | 7/1999 | Shioya et al. | |
| 5,947,547 A | 9/1999 | Deeks et al. | |
| 6,027,678 A | 2/2000 | Rehm et al. | |
| 6,063,460 A | 5/2000 | Souders et al. | |
| 6,149,224 A | 11/2000 | Tiberia et al. | |
| 6,174,396 B1 | 1/2001 | Casteel et al. | |
| 6,183,038 B1 | 2/2001 | Hansen et al. | |
| 6,196,607 B1 | 3/2001 | Gulisano | |
| 6,197,403 B1 | 3/2001 | Brown et al. | |
| 6,210,613 B1 | * 4/2001 | Stein et al. | 264/45.4 |
| 6,422,640 B2 | 7/2002 | Whitehead et al. | |
| 6,475,576 B1 | 11/2002 | Ashtiani et al. | |
| 6,508,967 B2 | 1/2003 | Visconti et al. | |
| 2001/0025456 A1 | 10/2001 | Furuyama et al. | |

* cited by examiner

APPARATUS AND METHOD OF MAKING INTERIOR TRIM PANEL

TECHNICAL FIELD

The present invention relates generally to interior trims for vehicles and, more particularly, to an apparatus and method of making an interior trim panel for a vehicle.

BACKGROUND OF THE INVENTION

It is known to provide an interior trim panel for a vehicle such as an automotive vehicle to present an aesthetically pleasing appearance in an occupant compartment of the automotive vehicle. The interior trim panel typically includes a trim blank or insert attached to a carrier or substrate by several different conventional processes including adhesives, heat staking, sonic welding, and fasteners. The interior trim panel may be mounted to structure of the vehicle such as an inner door panel of a door for the vehicle by suitable means such as fasteners.

It is also known that trim pieces may cover only certain zones or areas of the substrate. Retaining trim pieces in this isolated way causes two disadvantages. First, the process of filling a tool with plastic beads tends to force these beads onto a front side of the trim piece marring the part. Second, steam, which is used to expand the plastic beads, also migrates to the front side of the trim piece overheating certain fabrics, thereby allowing them to be crushed by the molding pressures, which is referred to as nap crush.

Therefore, it is desirable to reduce nap crush on an interior trim panel having trim pieces molded to a plastic trim panel substrate. It is also desirable to reduce nap crush on interior trim panels made by insert molding trim pieces in a thermoplastic bead molding process. Therefore, there is a need in the art to provide an apparatus and method of making an interior trim panel, which reduces nap crush, for attachment to an interior structure of a vehicle.

SUMMARY OF THE INVENTION

It is, therefore, one object of the present invention to provide a new apparatus and method of making an interior trim panel for a vehicle.

It is another object of the present invention to provide an apparatus and method to reduce nap crush by insert molding trim pieces in a thermoplastic bead molding process.

To achieve the foregoing objects, the present invention is a method of making an interior trim panel for attachment to structure of a vehicle including the steps of placing a trim insert into a cavity of an apparatus and over a seal thereof. The method also includes the steps of loading a retaining ring over the trim insert to sandwich the trim insert between the retaining ring and seal and closing the apparatus. The method further includes the steps of filling the cavity with a plastic material and introducing steam into the apparatus to expand the plastic material to form a substrate and bonding the substrate against the trim insert to form an interior trim panel.

In addition, the present invention is an apparatus for making an interior trim panel for attachment to structure of a vehicle. The apparatus includes a cavity side having a cavity for receiving a trim insert and a core side for cooperating with the cavity side. The apparatus also includes a seal disposed in the cavity adjacent an edge of the trim insert. The apparatus further includes a retaining ring disposed over the trim insert to sandwich the trim insert between the retaining ring and the seal. The core side has a plurality of steam apertures extending therethrough for introducing steam into the cavity to expand plastic material to form a substrate and bond the substrate against the trim insert to form an interior trim panel.

One advantage of the present invention is that an apparatus and method of making an interior trim panel is provided for a vehicle, which reduces nap crush. Another advantage of the present invention is that the apparatus and method allows trim pieces to be molded onto bead molded interior products as part of an overall interior trim panel, thereby greatly reducing nap crush. Yet another advantage of the present invention is that the apparatus and method reduces nap crush on interior trim panels made by insert molding trim pieces in a thermoplastic molding process. Still another advantage of the present invention is that the apparatus and method reduces cost through the use of less expensive trim materials for molding trim pieces onto bead molded products as part of an overall interior trim panel. A further advantage of the present invention is that the apparatus and method reduces nap crush on expanded polypropylene molded products. Still a further advantage of the present invention is that the apparatus and method reduces cost based on the elimination of adhesives, the reduction of process steps, and a reduction in tooling required. Another advantage of the present invention is that the apparatus and method eliminates an intermediate substrate and tooling required for that substrate. Yet another advantage of the present invention is that the apparatus and method eliminates the need for adhesives typically required to apply a trim insert, resulting in a less expensive part and a part that is more easily recycled.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
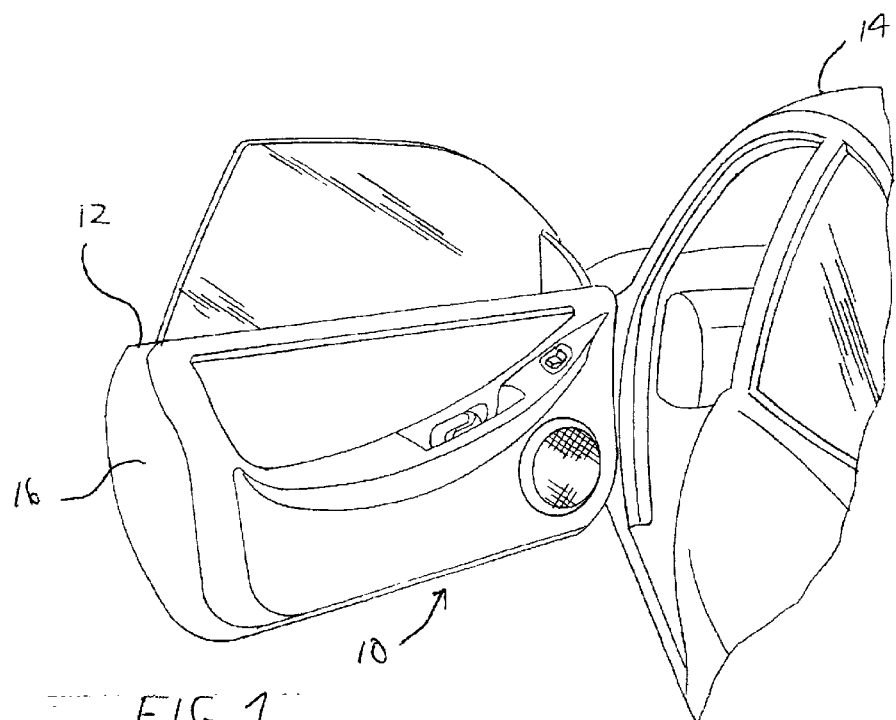
FIG. 1 is a perspective view of an interior trim panel made by a method, according to the present invention, illustrated in operational relationship with a vehicle.
Figure 2:
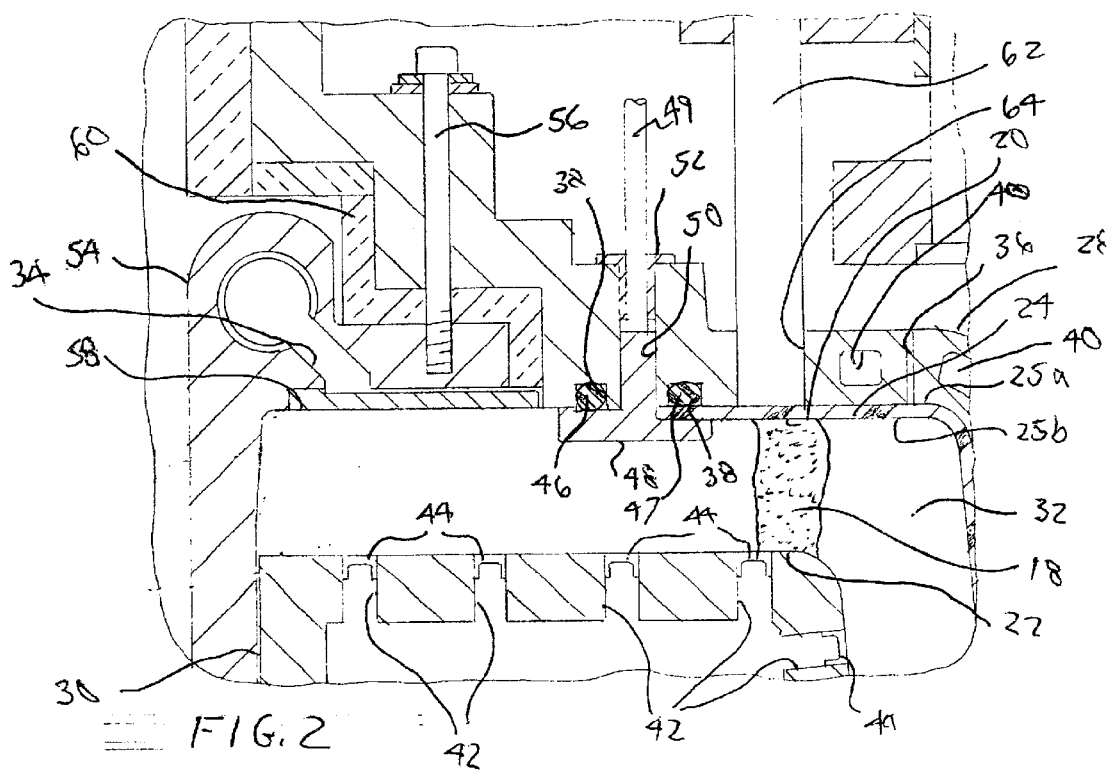
FIG. 2 is a fragmentary elevational view of an apparatus, according to the present invention, for making the interior trim panel of FIG. 1.
Figure 3:
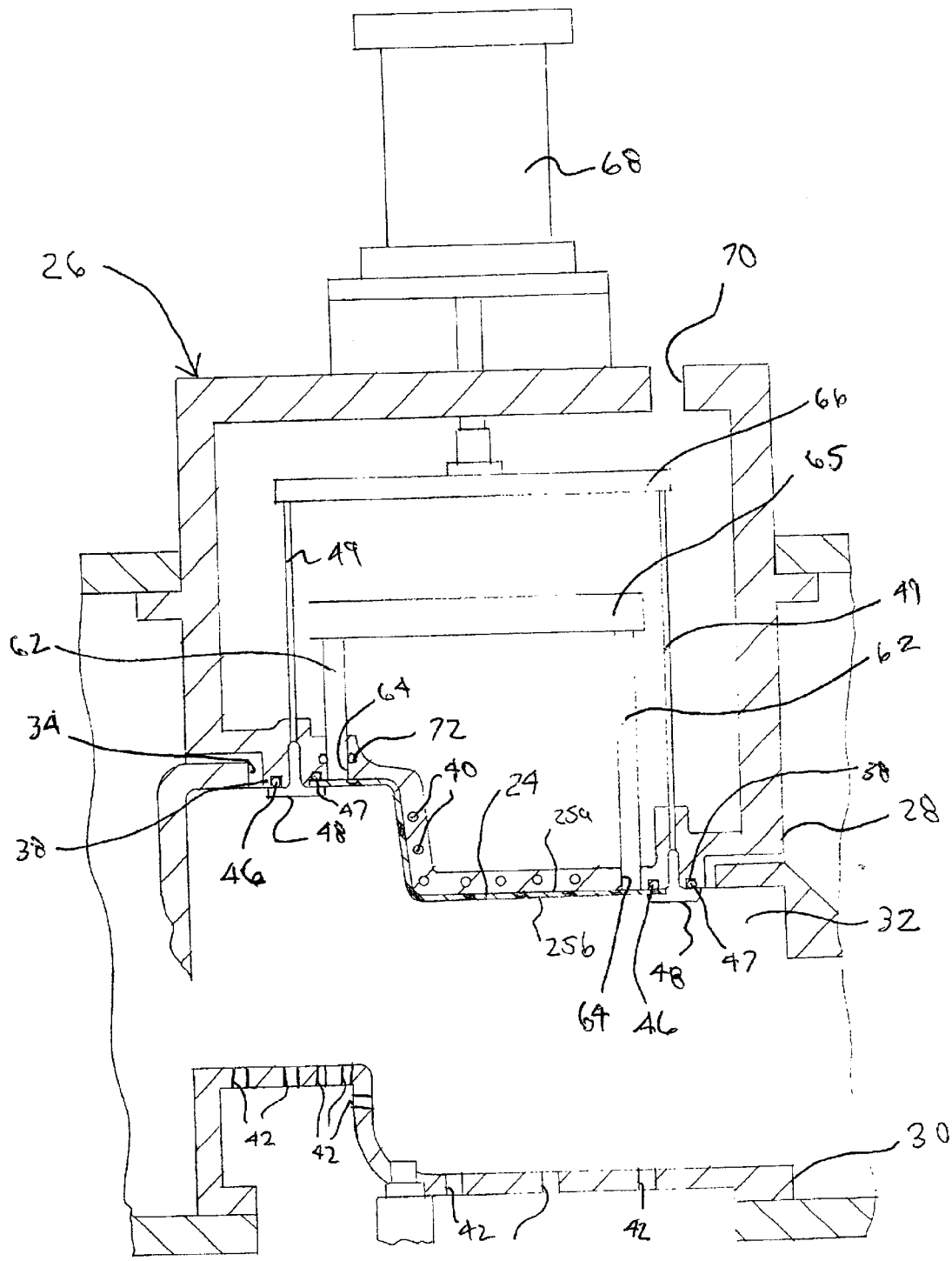
FIG. 3 is a fragmentary elevational view of a portion of the apparatus of FIG. 2 used in a method, according to the present invention, of making an interior trim panel.

Referring to the drawings and in particular FIGS. 1 through 3, one embodiment of an interior trim panel 10, according to the present invention, is shown mounted to structure such as a door 12 of a vehicle 14. It should be appreciated that, in this example, the interior trim panel 10 is mounted to an inner panel 16 of the door 12. It should also be appreciated that the interior trim panel 10 may be mounted to other structure or interior panels of the vehicle 14 such as instrument panels, consoles, rear window trim panels, floor panels, and garnish moldings.

The interior trim panel 10 includes a carrier or trim panel substrate 18 extending longitudinally and vertically and having a generally rectangular shape. The trim panel substrate 18 is made of a plastic material, preferably a thermoplastic material such as polypropylene. The trim panel substrate 18 has a first side 20 and a second side 22. The second side 22 is attached to the inner panel 16 of the door 12 by suitable means such as fasteners (not shown). It should be appreciated that the trim panel substrate 18 presents a class "A" surface as is known in the art.

The interior trim panel 10 also includes at least one component incorporated or integrated into the trim panel substrate 18. The component includes a trim insert 24 such as a foam fabric laminate. The trim insert 24 extends longitudinally and vertically. The trim insert 24 may be made of a fabric, cloth, vinyl, TPO (Thermoplastic Polyolifin), leather, or carpet material laminated to a foam made of a plastic material such as polypropylene. The trim insert 24 has a first side 25a and a second side 25b. The second side 25b of the trim insert 24 is bonded to the first side 20 of the trim panel substrate 18 by the thermoplastic material of the trim panel substrate 18. It should be appreciated that the trim insert 24 is a separate piece or component.

Referring to FIGS. 2 through 3, an apparatus, generally indicated at 26, is provided for making the interior trim panel 10. The apparatus 26 is of a steam chest type and includes a first or cavity side 28 and a second or core side 30. The cavity side 28 includes a cavity 32 extending axially therein. The cavity 32 is generally rectangular in shape, but may be any suitable shape. The cavity side 28 also includes at least one vacuum channel 34 extending axially therein for a function to be described. The cavity side 28 includes a plurality of vacuum or air counter pressure apertures 36 extending axially therethrough for a function to be described. The cavity side 28 further includes at least one, preferably a plurality of annular grooves or channels 38 extending axially and spaced laterally therein for a function to be described. The cavity side 28 includes at least one, preferably a plurality of localized cooling channels 40 extending transversely through the cavity side 28 to cool or control the temperature of the apparatus 26 adjacent the trim insert 24.

The core side 30 includes a plurality of steam apertures 42 extending axially therethrough and a plurality of steam vents 44 disposed within the steam apertures 42 for allowing a fluid such as steam to enter the cavity 32 when the apparatus 26 is closed. It should be appreciated that the core side 30 includes at least one, preferably a plurality of fill inlets (not shown) extending into the cavity 32 to allow fill guns (not shown) to fill the cavity 32 with the plastic material for the substrate 18.

The apparatus 26 includes a first seal 46 disposed in one of the channels 38 and a second seal 47 disposed in another adjacent and laterally spaced channel 38. The first seal 46 and second seal 47 are made of a flexible material such as a silicone material. The apparatus 26 further includes a rigid retainer 48 overlapping the channels 38 and a portion of the cavity side 28. The retainer 48 is an annular ring having a generally "T" shaped cross-section. The retainer 48 may be continuous or split due to complex surface contours. The retainer 48 extends axially into the cavity 32 to retain the trim insert 24. The retainer 48 has a plurality of rods 49 spaced therealong and extending through apertures 50 in the cavity side 28. The apparatus 26 may include bushings 52 in the apertures 50 through which the rods 49 extend. It should also be appreciated that the trim insert 24 is secured in the cavity 32 by the retainer 48. It should be appreciated this combination greatly reduces the amount of steam that can get to the front side 25a of the trim insert 24 and reduces the heat buildup on the front side 25a of the trim insert 24.

The apparatus 26 further includes a vacuum manifold 54 connected by suitable means such as fasteners 56 to the cavity side 28 and communicating with the vacuum channel 34 to pull moisture away from the trim insert 24. The apparatus 26 also includes a vacuum cover plate 58 disposed at one end of the vacuum channel 34 adjacent the cavity side 28 and connected thereto by suitable means such as fasteners (not shown). The apparatus 26 further includes insulation 60 disposed between the cavity side 28 and the vacuum manifold 54. It should be appreciated that the insulation 60 minimizes heat transfer through the apparatus 26 to the area adjacent the trim insert 24.

The apparatus 26 also includes at least one, preferably a plurality of ejector pins 62 extending axially through corresponding apertures 64 in the cavity side 28. The apparatus 26 includes an ejector plate 65 connected to the ejector pins 62 for moving the ejector pins 62 simultaneously to eject the molded interior trim panel 10. It should be appreciated that the ejector pins 62 are pneumatically driven to push the material off of the apparatus 26.

The apparatus 26 further includes a retainer plate 66 connected to the retainer 48 and a fluid cylinder 68 such as a hydraulic or pneumatic cylinder connected to the retainer plate 66 for moving the retainer 48 simultaneously. The apparatus 26 includes at least one vent 70 in the cavity side 28 to vent the cavity side 28 to atmosphere. It should be appreciated that the ejector pins 62 may be sealed with a seal 72 such as an O-ring or other similar sealing device. It should also be appreciated that the retainer 48 is pneumatically driven and cooperates with a double seal 46, 47 around the outside of the trim insert 24 to seal moisture away from the insert 24. It should further be appreciated that the ejector pins 62, ejector plate 65, and fluid cylinder 68 are conventional and known in the art.

A method, according to the present invention, of making the interior trim panel 10 using the apparatus 26 is disclosed. The method includes the step of placing the trim insert 24 into the cavity 32 of the apparatus 26 and retaining the trim insert 24 in the cavity 32 using the retainer 48. The trim insert 24 can be loaded into the cavity 32 manually or with a robot (not shown) and held in place until the retainer 48 is closed with the fluid cylinder 68 onto the trim insert 24 pressing it against the seals 46, 47 which is mounted into the surface on the cavity side 28. It should be appreciated that the retainers 48 have a portion engaging the trim insert 24 and another portion engaging the first seal 46. It should also be appreciated that the cavity side 28 of the apparatus 26 is thermally and physically isolated from the female steam chest and open to atmosphere via the vent 70. It should further be appreciated that the temperature of the surface of the cavity side 28 is maintained via a temperature control unit (not shown) and is independent of the rest of the apparatus 26, with temperature controlled with conventional steam chest molding methods. It should still further be appreciated that the surface of the cavity side 28 in the area adjacent the trim insert 24 contains no vents or passages to allow steam or moisture to enter the interface area between the trim insert 24 and the surface of the cavity side 28.

After the trim insert 24 is loaded into the apparatus 26 and the retainer 48 compresses the seals 46, 47 the method includes the step of closing the apparatus 26 to a molding position. Once the apparatus 26 is closed, the method includes the step of filling the cavity 32 with the plastic material for the substrate 18. The filling can either be a crush fill or pressure fill. In the preferred embodiment, the plastic material is in the form of thermoplastic beads that are blown into the cavity 32 of the apparatus 26 and are of a class of beads used in steam chest molding. Preferably, the thermoplastic beads are expanded polypropylene, but may be expanded polyethylene or expanded polystyrene (Styrofoam). As such, the cavity 32 is filled with beads of expanded polypropylene blown therein, which enter the apparatus 26 via the fill inlets. It should be appreciated that the beads are blown into the apparatus 26 using standard bead molding techniques. It should also be appreciated that the beads are effectively kept out of the front side 25a of the trim insert 24. It should further be appreciated that this may or may not be followed by a compression cycle where the beads are somewhat compressed.

Next, the method includes the step of introducing steam into the apparatus 26 via the steam apertures 42 and steam vents 44 to expand the plastic material, form the substrate 18, and bond the plastic material to the trim insert 24 to form the interior trim panel 10. The beads of polypropylene expand and are fused together with mechanical and thermoplastic bonding occurring to the trim insert 24. It should be appreciated that this is a combination of cross steaming and autoclaving. It should also be appreciated that a pressure relief mechanism comes from the vent openings or passages (not shown) adjacent to the retainer 48, which allow steam to pass freely through these passages 36 into a chamber which is open to atmosphere via the vent 70. It should further be appreciated that the subsequent pressure reduction at the sealing surfaces eliminates the possibility of steam passing under the first seal 46, thereby eliminating the environment necessary to induce nap crush. It should still further be appreciated that, in addition, the local cooling channels 40 prevent heat buildup on the front side 25a of the trim insert 24.

The method may include the step of cooling the apparatus 26 by spraying a coolant such as water through nozzles (not shown) onto the backside of the apparatus 26. Once the interior trim panel 10 is cooled or after a suitable time for fusion and cooling, the method includes the step of opening the apparatus 26 and removing or demolding the interior trim panel 10 from the apparatus 26 via the ejector pins 62. Finally, the method includes the step of attaching the interior trim panel 10 to the inner panel 16 of the door 12 by suitable means such as fasteners, adhesives, heat staking, sonic welding or the like.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of making an interior trim panel for attachment to structure of a vehicle, said method comprising the steps of:
    placing a trim insert into a cavity of an apparatus and over a first seal thereof;
    loading a retainer separate from the first seal over the trim insert to sandwich the trim insert between the retainer and the first seal;
    closing the apparatus;
    filling the cavity with a plastic material; and
    introducing steam into the apparatus to expand the plastic material to form a substrate and bonding the substrate against the trim insert to form an interior trim panel.

2. A method as set forth in claim 1 including the step of providing a second seal spaced from the first seal and contacting the second seal with the retainer against a cavity side of the apparatus.

3. A method as set forth in claim 1 wherein said step of filling comprises filling the cavity with a plurality of plastic beads.

4. A method as set forth in claim 3 wherein said step of filling further comprises blowing the plastic beads into the cavity.

5. A method as set forth in claim 3 wherein the plastic beads are either expanded polypropylene beads, expanded polyethylene beads, and expanded polystyrene beads.

6. A method as set forth in claim 3 wherein said step of introducing comprises introducing steam into the apparatus to expand the plastic beads.

7. A method as set for the in claim 1 including the step of providing the trim insert before said step of placing.

8. A method as set forth in claim 1 including the step of providing at least one vent opening on the cavity side of the apparatus.

9. A method as set forth in claim 8 including the step of venting steam from the apparatus through the vent opening.

10. A method as set forth in claim 1 wherein the trim insert is pre-formed from at least one from a group comprising fabric, cloth, vinyl, TPO (Thermoplastic Polyolefin), leather or carpet material laminated to a foam material.

11. A method of making an interior trim panel for attachment to structure of a vehicle, said method comprising the steps of:
    placing a trim insert into a cavity of an apparatus and over a first seal thereof;
    loading a retainer with a generally T shaped cross-section over the trim insert to sandwich the trim insert between the retainer and the first seal;
    closing the apparatus;
    filling the cavity with plastic material; and
    introducing steam into the apparatus to expand the plastic material to form a substrate and bonding the substrate against the trim insert to form an interior trim panel.

12. A method as set forth in claim 1 including the steps of cooling the interior trim panel, opening the apparatus, and removing the interior trim panel from the apparatus.

13. A method of making an interior trim panel for attachment to an interior panel of a vehicle, said method comprising the steps of:
    providing a first seal and a second seal spaced from the first seal in a cavity side of an apparatus;
    placing a trim insert into a cavity of the apparatus and over the first seal thereof;
    loading a retainer separate from the first seal and the second seal over the trim insert and having a portion engaging the trim insert to sandwich the trim insert between the retainer and the first seal to hold the trim insert against a cavity side of the apparatus and having another portion contenting the second seal with the retainer;
    closing the apparatus;
    filling the cavity with a plurality of plastic beads; and
    introducing steam into the apparatus to expand the plastic beads to form a substrate and bonding the substrate against the trim insert to form an interior trim panel.

* * * * *